United States Patent [19]

Jeon et al.

[11] Patent Number: 5,734,665
[45] Date of Patent: Mar. 31, 1998

[54] OPTICAL FIBER LASER

[75] Inventors: Min-Yong Jeon; Wang-Yuhl Oh; Hak-Kyu Lee; Kyong-Hon Kim; El-Hang Lee, all of Daejeon, Rep. of Korea

[73] Assignee: Electronics and Telecommunications Research Institute, Daejeon, Rep. of Korea

[21] Appl. No.: 710,525

[22] Filed: Sep. 18, 1996

[30] Foreign Application Priority Data

Dec. 7, 1995 [KR] Rep. of Korea .................. 95-47434

[51] Int. Cl.⁶ .................................................. H01S 3/30
[52] U.S. Cl. .................................................. 372/6
[58] Field of Search ........................................ 372/6

[56] References Cited

U.S. PATENT DOCUMENTS

| | | | |
|---|---|---|---|
| 5,477,555 | 12/1995 | Debeau et al. | 372/6 |
| 5,497,386 | 3/1996 | Fontana | 372/6 |
| 5,513,194 | 4/1996 | Tamura et al. | 372/6 |
| 5,623,362 | 4/1997 | Mitsuda et al. | 372/6 |
| 5,638,204 | 6/1997 | Grasso et al. | 372/6 |

Primary Examiner—Leon Scott, Jr.
Attorney, Agent, or Firm—Antonelli, Terry, Stout, & Kraus, LLP

[57] ABSTRACT

An optical fiber laser is disclosed capable of generating an ultrashort pulse which has intensive energy and is stable against polarization by using a sagnac loop mirror and a Faraday rotator mirror, which includes a light pumping laser diode; an erbium doped fiber-added optical fiber; a wavelength division multiplier fiber coupler; a dispersion shifted fiber; and an optical fiber directional coupler; a nonlinear amplifier loop mirror; a second polarization controller; a linear mirror having a Faraday rotator mirror for rotating the polarization plane of a proceeding light wave; and a directional coupler being connected between the nonlinear amplifier loop mirror and the linear mirror.

2 Claims, 4 Drawing Sheets

OPTICAL FIBER LASER

BACKGROUND OF THE INVENTION

1. Field of the Invention

The present invention relates to an optical fiber laser, and more particularly to an optical fiber laser capable of generating an ultrashort pulse which has intensive energy and is stable against polarization by using a Sagnac loop mirror and a Faraday rotator mirror.

A conventional optical fiber laser is disclosed in U.S. Pat. No. 8,128,187 and U.S. Pat. No. 5,449,383.

2. Description of the Prior Art

An ultrashort pulse generated from an optical fiber laser has a short pulse width, so that it is advantageously used for ultrahigh-speed optical telecommunication. However, since a light source thereof is composed of an optical fiber, it is very susceptible to an exterior environment, causing a difficulty in obtaining a reliable optical pulse output.

A conventional optical fiber laser is proposed in U.S. Pat. No. 8,128,187 and U.S. Pat. No. 5,449,383, disclosing figure-eight type optical fiber laser structure and a ring-type laser structure, respectively.

FIG. 1 is a conventional structure of figure-eight type mode locking optical fiber laser, and FIG. 2 is a conventional structure of ring-type mode locking optical fiber laser.

In these drawings, reference numeral 11 denotes a 50:50 optical fiber directional coupler, 12 denotes a wavelength division multiplier fiber coupler, 13 denotes a 90:10 fiber directional coupler, 21 and 22 denote polarization controllers, 31 denotes an optical isolator, 41 denotes a dispersion shifted fiber, 42 denotes an erbium doped fiber, and 51 denotes a 980 nm optical pumping laser diode, respectively.

As to the optical fiber laser having figure-eight type structure as disclosed in the U.S. Pat. No. 8,128,187, a device having a different light damage according to direction is inserted into one loop and a light nonlinear device reacted according to light intensity is inserted into the other loop. The loop having the nonlinear device inserted thereto includes an erbium doped fiber and is pumped by a pump light. A mode locking light pulse coming from this mode is again fedback so that the pulse is contracted, the mode locking is oscillated, and the pulse repeatability is adjusted.

On the other hand, in the U.S. Pat. No. 5,449,383, a structure is proposed in that a semi-resonance nonlinear mirror is used instead of a mirror at one side in the existing laser structure, to thereby induce a passive mode locking. The semi-resonance mirror has such a structure that a non-isotropic nonlinear device according to the light intensity and a device reacted to the polarization to induce an autonomous mode locking are inserted into a ring-type frame which is designed to enable two beams by a beam distributor to proceed in the mutually opposite direction to return, so as to adjust double refractive index.

However, in such a structure, much unstable pulse signal is obtained due to the double refractive index of the optical fiber. Also, an energy of the pulse becomes weak due to occurrence of a solution pulse (normally below 100 pJ).

SUMMARY OF THE INVENTION

Therefore, an object of the present invention is to provide an optical fiber laser capable of generating an ultrashort pulse which has intensive energy and is stable against polarization by using a Sagnac loop mirror and a Faraday rotator mirror.

In order to attain the above object, there is provided an optical fiber laser including a light pumping laser diode for outputting a light exciting an erbium doped fiber to oscillate a required light wave; an erbium doped fiber-added optical fiber for rendering a reversal distribution between two energy potentials of an upper energy and a lower energy and sequentially oscillating the required light wave in case that the light of the laser diode is inputted thereto; a wavelength division multiplier fiber coupler being coupled between the laser diode and the erbium doped fiber-added optical fiber for transmitting a light outputted from the laser diode to the erbium doped fiber-added optical fiber; a dispersion shifted fiber for giving a nonlinear effect on a light oscillated and proceeded from the erbium doped fiber-added optical fiber; a linear mirror including a nonlinear amplifier loop mirror having a first polarization controller coupled thereto in a loop type, the first polarization controller controlling the polarized light of the proceeding light so as to maximize an output of the continuously oscillated light wave, a second polarization controller for controlling the polarized light to make the light wave oscillated from the nonlinear amplifier loop mirror be a passive mode locking, and a Faraday rotator mirror which rotates a polarized plane of the proceeding light wave, for compensating a polarization difference between the light wave of the light pumping laser diode and the light wave outputted from the nonlinear amplifier loop mirror; and optical fiber directional coupler being connected between a linear mirror and the nonlinear amplifier loop mirror for transmitting one partial light wave outputted from the nonlinear amplifier loop mirror to the linear mirror, for transmitting the other partial light wave to an output section, and for transmitting the light wave reflected on the linear mirror to the nonlinear amplifier loop mirror.

DESCRIPTION OF THE PREFERRED EMBODIMENT

A preferred embodiment of the present invention will now be described with reference to the accompanying drawings.

Figure 1:
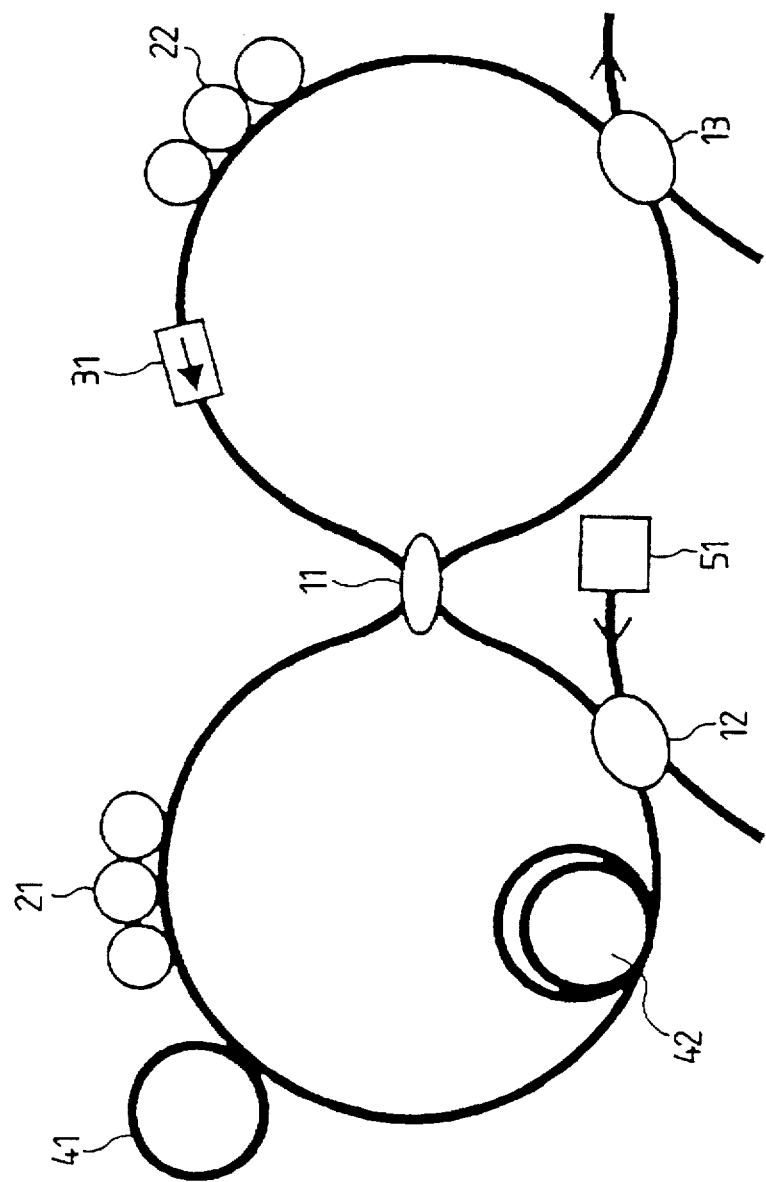
FIG. 1 shows a structure of a conventional 8-shaped mode locking optical fiber laser.
Figure 2:
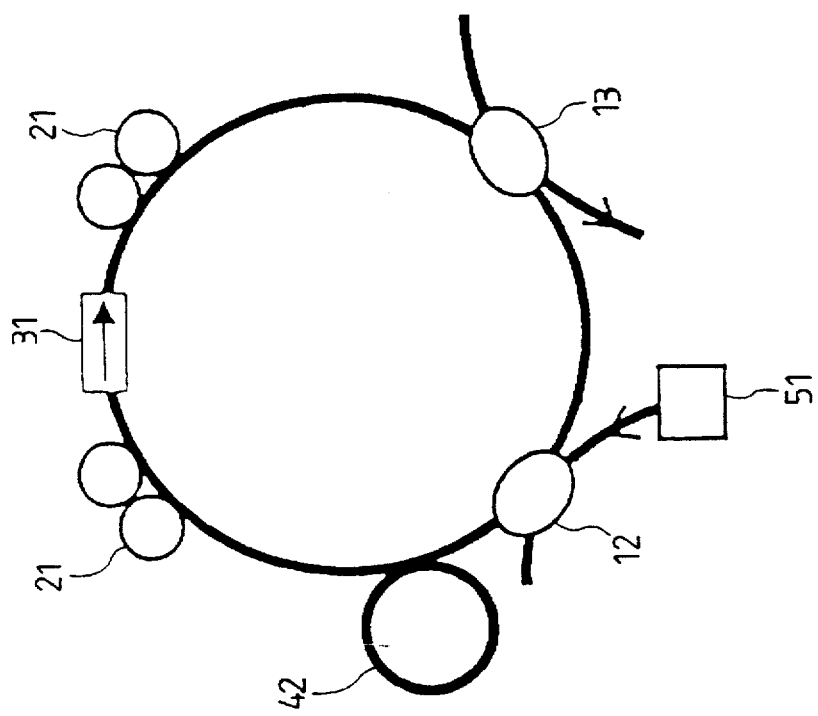
FIG. 2 shows a structure of a conventional ring-type mode locking optical fiber laser.
Figure 3:
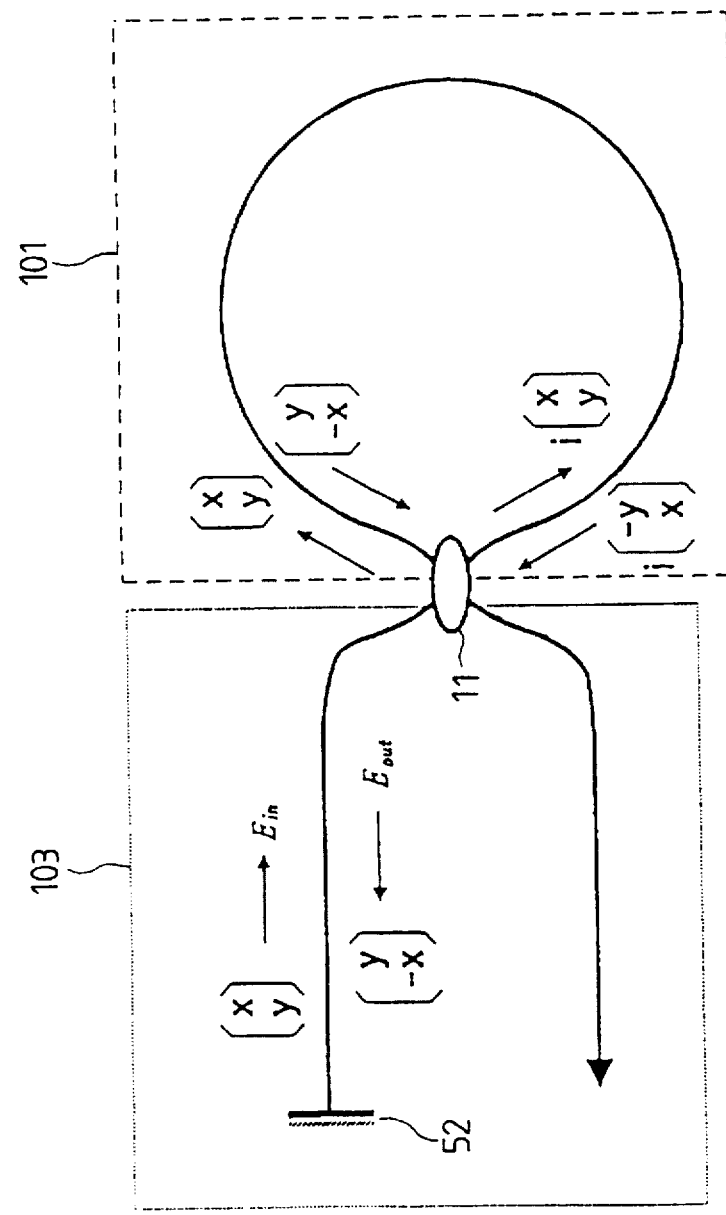
FIG. 3 shows a principle of the present invention.

FIG. 3 is a descriptive view showing an oscillating principle of a new structure in accordance with the present invention. In this figure, a light incident on a Sagnac loop mirror 101 is expressed $\vec{E}_{in}$ while a light reflected therefrom is expressed by $\vec{E}_{out}$. In this respect, $\vec{E}_{in}$ and $\vec{E}_{out}$ are normalized field vectors. The light $\vec{E}_{out}$ reflected from the sagnac loop mirror 101 is expressed by the following equation:

$$\vec{E}_{out} = (1/2)(e^{i\phi NR/2}B + e^{-i\phi NR/2}B^T)\vec{E}_{in} \qquad (1)$$

In this equation, B denotes a Jones matrix of the light when it turns around the loop clockwise. This matrix includes everything occurring in the loop such as the birefringence of the loop and the directional coupler. $B^T$ denotes Jones matrix corresponding to a light turning around counterclockwise, that is, transpositional matrix of B. $\phi$NR denotes a nonlinear phase difference occurring between the two lights in the loop.

The optimal condition for occurring passive mode locking in the Sagnac loop mirror is that the reflectivity is to be zero against a continuous wave light and the reflectivity is to be maximum against a pulse.

That is, the condition that the signal of the pulse has the maximal reflectivity (R=1) is when $\phi NR=\pi$. The value of B for satisfying the condition is when $$\mathbb{B} = \begin{bmatrix} 0 & -1 \\ 1 & 0 \end{bmatrix}$$

The above matrix can be obtained by suitable controlling of the polarization controller in the loop.

Assumed that $\Phi NR=\pi$, when the value of B is substituted for the equation (1), the following equation is expressed in the passive mode locking.

$$\vec{E_{out}} = \begin{bmatrix} 0 & 1 \\ -1 & 0 \end{bmatrix} \vec{E_{in}}$$

The above obtained equation can be explained as follows. The polarization state of the light which has been reflected from the Sagnac loop mirror and passively mode-locked is rotated 90° against the polarization state of the incident light. Therefore, for the purpose of compensating polarization state turned by 90°, a device is required outside the loop mirror for polarization turning, which is a Faraday rotator mirror 52.

The Faraday rotator mirror satisfies enough a laser resonance condition that when the light proceeds during one cycle, the polarization state of the oscillated light is to be the same both before the light proceeds during a cycle and after it turns around during the cycle. Accordingly, it is expected that while the ultrashort pulse is being oscillated, the polarization state of the laser resonance during one cycle is fitted so that a reliable pulse signal can be generated.

Also, in such a structure as described above, by inserting a light modulator in the loop mirror, an active mode-locked light pulse of more stable pulse signal having a high repeatability can be oscillated.

Figure 4:
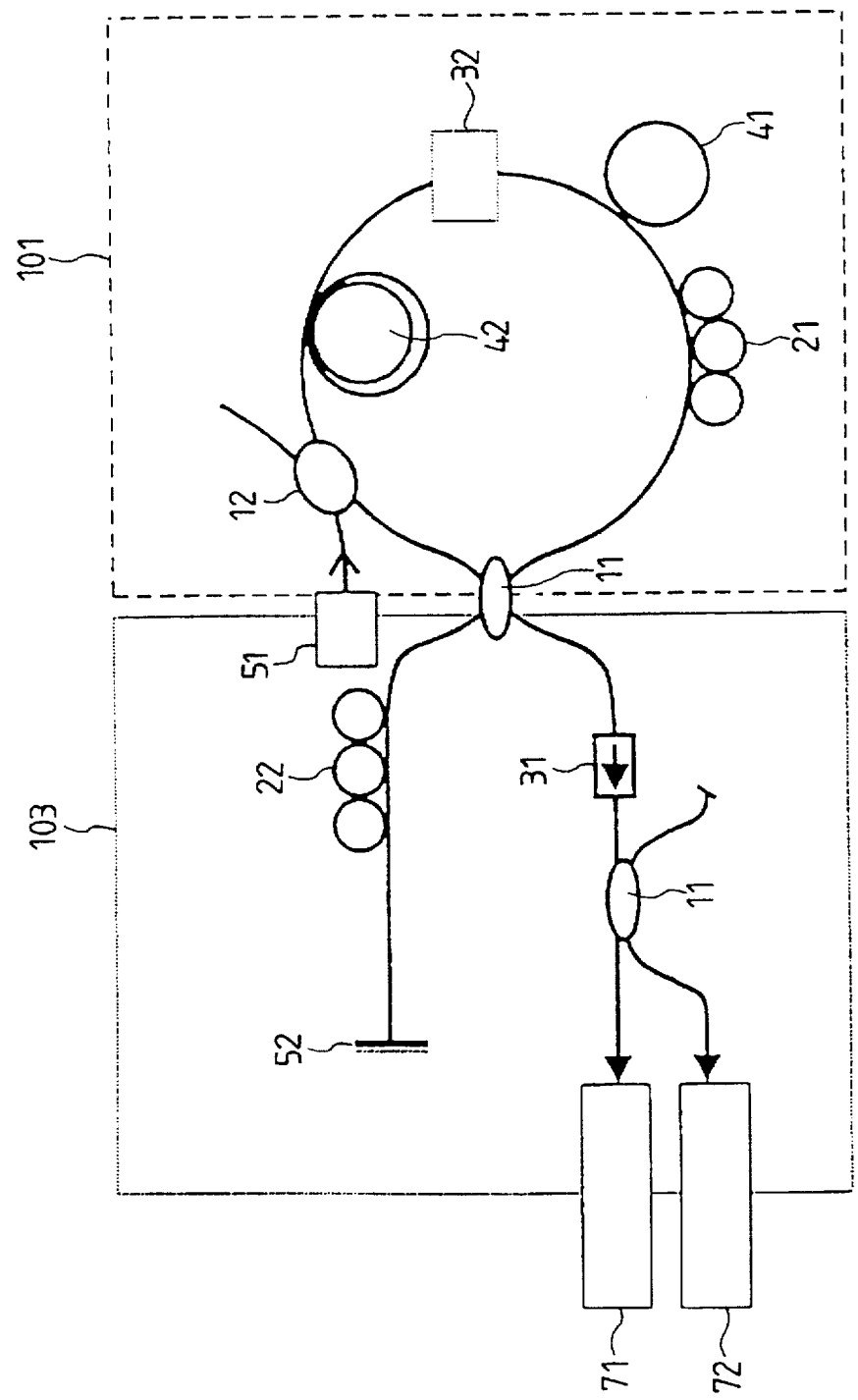
FIG. 4 shows a structure of an optical fiber laser in accordance with the present invention.

FIG. 4 shows a experimental device of the optical fiber laser by using the Sagnac loop mirror and the Faraday rotator mirror in accordance with the present invention. In this figure, reference numeral 11 denotes 50:50 directional coupler, 12 denotes a wavelength division multiplier fiber coupler, 13 denotes 90:10 directional coupler, 21 and 22 denote polarization controller, 31 denotes an optical isolator, 32 denotes a light modulator, 41 denotes a dispersion shifted fiber, 42 denotes an erbium doped fiber, 51 denotes a 980 nm light pumping laser diode, 52 denotes a Faraday rotation mirror, 71 denotes a Optical spectrum analyzer, 72 denotes an autocorrelation analyzer, 101 denotes a nonlinear amplifier loop mirror, 103 denotes a linear mirror, respectively.

An erbium doped fiber 42 of 800 ppm with length of 10 m is positioned at one end of the loop, and dispersion shifted fiber 41 having zero dispersion wave length of 1550 nm with length of 17 m is connected to the other portion thereof so as to have a nonlinear effect.

Also, the polarization controller 21 is inserted so as to return the polarization inside the loop.

Dispersion value of the dispersion shifted fiber at 1550 nm is that $|D|=3.5$ ps/nm/km. Light pumping is performed by a 980 nm semiconductor laser 51 by using 980/1550 wavelength division multiplier fiber coupler 12.

According to the principle observed at front side of the linear mirror 103, the Faraday rotator mirror 52 is connected thereto, and the polarization controller 22 is inserted so as to control the polarization. The 3 dB directional coupler 11 is connected between the Sagnac loop mirror 101 and the Faraday rotator mirror 52.

The length of the Sagnac loop mirror 101 is total 29 m, and that of the linear mirror 103 is about 5 m. Interval of the longitudinal mode of the resonator corresponding to this length is 5.1 MHz. The outputted light signal is received by the other port of the Sagnac loop mirror.

Generally, the passive mode locking is accomplished by using the polarization controller. However, as shown in FIG. 4, the light modulator can be inserted into the loop so that the optical fiber laser which actively mode-locked with the high repeatability can also be accomplished.

The pumping output of the 980 nm semiconductor laser 51 within the Sagnac loop mirror is pumped to about 40 mW which is far more than the continuous oscillating threshold value (7 mW), and the polarization controller 21 within the loop mirror 101 can be suitably controlled so that the continuously oscillating output is to be almost maximized. As can be seen at the aforementioned principle, this is the same concept that the phase difference of the light turning around in both directions within the loop mirror 101 is made to be $\pi$.

Under the condition, the polarization controller 22 within the linear mirror 103 is controlled to oscillate the passive mode locking.

As so far described, according to the present invention, the effectiveness can be obtained that more reliable optical pulse which is mode-locked and the energy of a peak pulse is very intensive can be oscillated.

What is claimed is:

1. An optical fiber laser comprising:
   a light pumping laser diode for outputting a light exciting an erbium doped fiber to oscillate a required light wave;
   an erbium doped fiber-added optical fiber for rendering a reversal distribution between an upper energy and a lower energy and sequentially oscillating the required light wave in case that the light of the laser diode is inputted thereto;
   a wavelength division multiplier fiber coupler being coupled between the laser diode and the erbium doped fiber-added optical fiber for transmitting a light outputted from the laser diode to the erbium doped fiber-added optical fiber;
   a dispersion shifted fiber for giving a nonlinear effect on a light oscillated and proceeded from the erbium doped fiber-added optical fiber; and
   a linear mirror including a nonlinear amplifier loop mirror having a first polarization controller coupled thereto in a loop type, the first polarization controller controlling the polarized light of the proceeding light so as to maximize an output of the continuously oscillated light wave, a second polarization controller for controlling the polarized light to make the light wave oscillated from the nonlinear amplifier loop mirror to be a passive mode locking, and a Faraday rotator mirror which rotates a polarized plane of the proceeding light wave, for compensating a polarization difference between the light wave of the light pumping laser diode and the light wave outputted from the nonlinear amplifier loop mirror; and optical fiber directional coupler being connected between a linear mirror and the nonlinear amplifier loop mirror for transmitting one partial light wave outputted from the nonlinear amplifier loop mirror to the linear mirror, for transmitting the other partial light wave to an output section, and for transmitting the light wave reflected on the linear mirror to the nonlinear amplifier loop mirror.

2. The optical fiber laser according to claim 1, further includes a light modulator to oscillate a reliable pulse signal having a high repeatability placed at the nonlinear amplifier loop mirror.

* * * * *